United States Patent [19]

Derowitsch

[11] Patent Number: 4,880,057
[45] Date of Patent: * Nov. 14, 1989

[54] PROCESS FOR REMOVING CARBONATE FROM WELLS

[76] Inventor: Richard W. Derowitsch, 956 Dixie Beach Blvd., Sanibel, Fla. 33957

[*] Notice: The portion of the term of this patent subsequent to Oct. 18, 2005 has been disclaimed.

[21] Appl. No.: 259,016

[22] Filed: Oct. 17, 1988

Related U.S. Application Data

[63] Continuation-in-part of Ser. No. 46,587, May 4, 1987, Pat. No. 4,778,006.

[51] Int. Cl.$^4$ .............................................. E21B 43/27
[52] U.S. Cl. .................................... 166/267; 166/307; 166/312; 252/8.552; 252/8.553
[58] Field of Search ............... 166/266, 267, 307, 312, 166/902; 252/8.552, 8.553

[56] References Cited

U.S. PATENT DOCUMENTS

| | | | |
|---|---|---|---|
| 2,059,459 | 6/1936 | Hund et al. | |
| 2,124,530 | 6/1936 | Loomis et al. | |
| 2,787,326 | 4/1957 | Hughes | 166/312 X |
| 2,964,109 | 12/1960 | Martin | 166/312 X |
| 3,528,503 | 7/1968 | Crowe | 166/300 |
| 3,651,868 | 7/1970 | Caudle et al. | 166/307 |
| 3,915,234 | 10/1975 | Pelofsky | 166/307 |
| 3,954,636 | 5/1976 | Crowe et al. | 166/307 X |
| 4,051,901 | 10/1977 | Sarem et al. | 166/292 X |
| 4,250,965 | 2/1981 | Wiseman, Jr. | 166/307 X |
| 4,462,713 | 7/1984 | Zurcher et al. | 166/267 X |
| 4,541,488 | 9/1985 | Gomory et al. | 166/307 |
| 4,670,157 | 6/1987 | Nicksic | 166/266 X |

OTHER PUBLICATIONS

*Collier's Encyclopedia*, vol. 5 (1986), "Calcium", p. 122.
*The Encyclopedia Americana*, International Edition (1983), "Calcium Carbonate", p. 160.
*The New Encyclopedia Brittanica* (15th Ed. 1985), vol. 16, "Continental Landforms", pp. 791–793.

*Primary Examiner*—George A. Suchfield
*Attorney, Agent, or Firm*—Duckworth, Allen, Dyer & Doppelt

[57] ABSTRACT

A process of removing carbonates from a well of a water collection and treatment system utilizes "aggressive" water obtained prior to the end of the water treatment process to remove carbonate deposits from the well. A preferred embodiment uses water which is the product of a reverse osmosis desalinization water treatment step and which is injected with carbon dioxide to form an aqueous carbonic acid solution for removal of the carbonate.

6 Claims, 1 Drawing Sheet

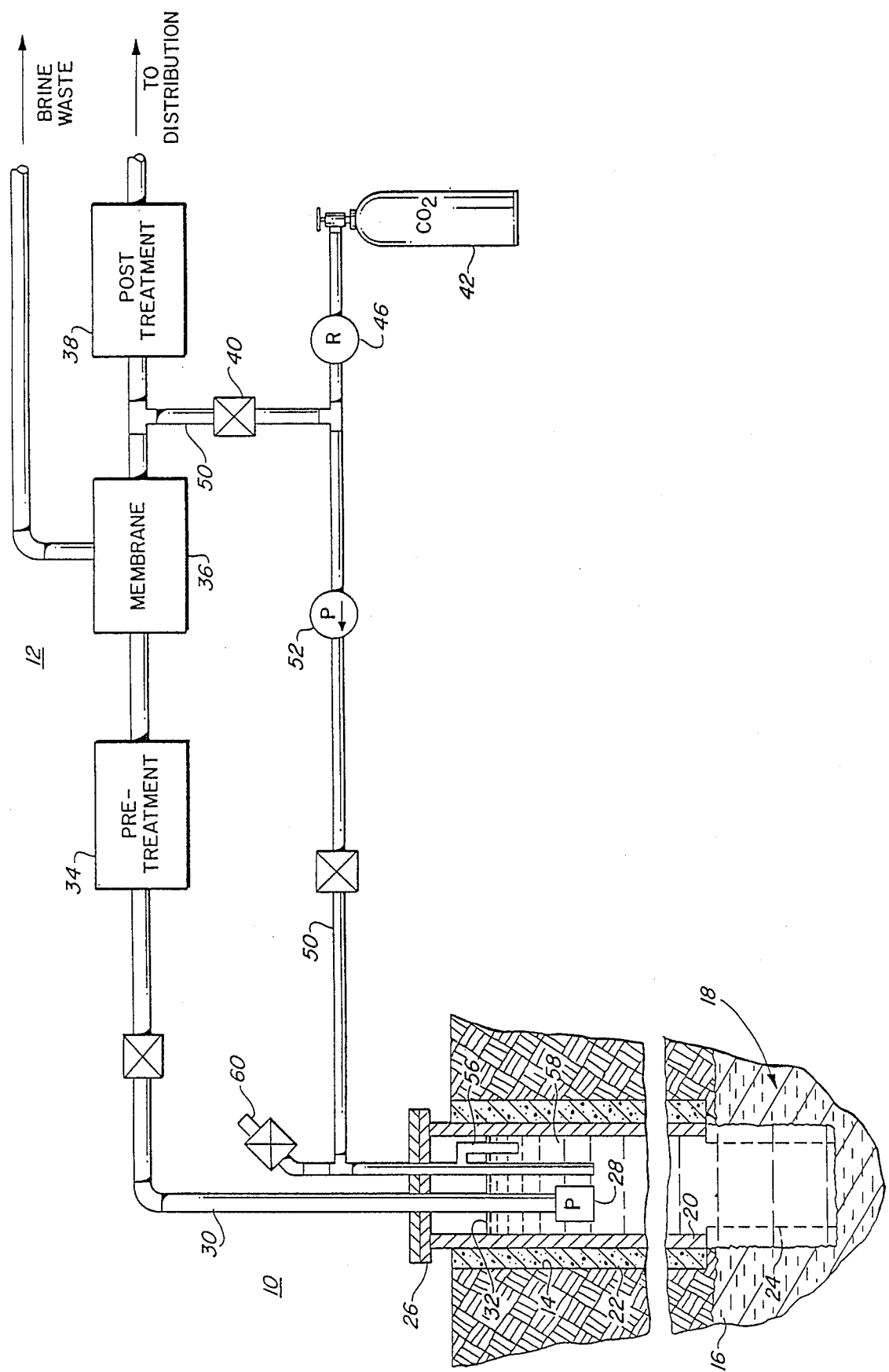

4,880,057

PROCESS FOR REMOVING CARBONATE FROM WELLS

This application is a continuation-in-part of copending application Ser. No. 046,587, filed May 4, 1987, now U.S. Pat. No. 4,778,006.

BACKGROUND OF THE INVENTION

This invention relates to a process for removing carbonate deposits from wells, especially from water wells which connect to water treatment facilities.

Groundwater is used as a source of water supply for much of the United States. Such water is typically drawn from underground deposits of unconsolidated granular materials, like sand and gravel, and from passages of sedimentary rocks, like limestone. Collection often involves pumping the water from the ground by means of a submersible or other pump through a well which extends from the Earth's surface down to the level of a water-bearing stratum or aquifer. The part of the well borehole above the aquifer is frequently covered with concrete and steel casing or similar structure to support the walls and prevent contamination of the water source by surface pollutants. The use of PVC has replaced steel as a casing material in the construction of most new water wells. Screens are sometimes fitted where the water flows into the well to prevent the inflow of loose materials from filling the well and clogging the system. Water wells may be public or private and serve to supply water for general household purposes, irrigation, livestock rearing, manufacturing, and other various uses.

After extraction from the well, the water is treated to bring it into conformity with required standards of purity. The water may be subjected to physical treatments to remove particulates and may also be exposed to chemicals to cause disinfection, oxidation and coagulation. The manner and degree of treatment will depend on the source of the water and its intended end use. For home use, attention must be paid to ensuring acceptable color, taste, odor and turbidity, as well as to the removal of pathogenic bacteria and harmful pollutants. Care must also be taken to assure a proper level of pH (acidity or alkalinity).

"Hard" waters, which are those having high calcium or magnesium content, are usually subjected to a softening procedure. One way of softening is to add lime and soda ash to cause calcium carbonate and magnesium hydroxide precipitation. This leaves the waters unstable, however, so that stabilization by recarbonation or other means is performed following treatment. Other softening methods include exposing the waters to zeolites (hydrated aluminum silicates) and passing the waters through ion exchange resins.

Where the groundwater supply is brackish, the treatment process typically includes a desalinization (desalting) step to render the saline water potable. Desalinization may be accomplished by distillation, electrodialysis, reverse osmosis, freeze-separation, hydration crystallization, or solvent-demineralization by ion exchange. In the reverse osmosis process, desalting is brought about by applying pressure to permit the passage of water through semipermeable membranes while impeding the passage of salt ions. (This is a reversal of the normal electrodialysis process in which electric current draws the salt ions through the membranes, leaving the desalted water.)

It is quite common, especially in deep water wells, for calcium and magnesium carbonate to be deposited in the water intake zone of the borehole by water flowing into the well. Although this phenomenon proceeds at a much greater rate, it is not unlike the deposition of calcium carbonate that results in the stalagmite and stalactite formations of limestone caves.

As groundwater moves through the host rock it is in contact with minerals, such as limestone (calcium carbonate), for a long time. Chemical dissolution takes place and the water moves together with dissolved mineral salts in chemical equilibrium toward the borehole. At the reservoir/well interface, the equilibrium is disrupted by the sudden change in pressure and precipitation of insoluble material (viz. calcium carbonate) results. The rate of carbonate deposition is related to water quality and to borehole entrance velocities during pumping.

With the passage of time, carbonate buildup in the well can begin to seriously interfere with water production. Water drawn from the well is replenished by new water from the cracks and fissures of the water-bearing stratum. If water is drawn from the well at a faster rate than the rate at which water from the stratum replaces it, the static water level in the well is lowered, and a condition known as "drawdown" exists. Severe drawdown can burn out the pump and shut down the treatment plant. Permeability reduction of the well caused by calcification, and particularly the build-up of calcium and magnesium carbonates in the region of the reservoir-well interface, is a leading cause of well drawdowns in deep water wells.

Well performance may be quantified in terms of well "specific capacity," which is the well discharge rate per unit of drawdown, expressed as gpm/ft. Carbonate removal is essential to restoring well specific capacity that has been unacceptably reduced by calcification.

Conventional techniques for removing carbonate from wells involve the pumping of strong concentrated acid (usually hydrochloric acid) into the well, allowing the acid to react with the formation for several hours, and then flushing the spent acid from the well. The results are not always effective due to the uneven distribution of acid within the well. Moreover, such procedures create the potential for serious injuries. The concentrated acid and its fumes can burn the skin and lungs. The acid can easily dissolve many types of pipe fittings, creating dangerous spills. Furthermore, fumes generated during treatment build up quickly and can cause large explosions if not properly vented. Accordingly, special crews and equipment are needed. Also, as a safety precaution, the fire department and/or emergency medical service are usually called to stand by to be able to flush spills and treat injuries.

The special crews and equipment, care in shipping and handling, and the attendant dangers makes the conventional carbonate removal process very costly, especially for rural community water supply organizations whose budget does not justify maintaining such resources in-house. It is not uncommon for such organizations to have to spend over $13,000 per well, two or more times per year.

SUMMARY OF THE INVENTION

It is an object of the present invention to overcome the above and other drawbacks of the prior art by providing a safe and inexpensive process for removing carbonate deposits from water wells that does not require special crews and equipment.

The copending application Ser. No. 046,587 relates to a process for removing carbonate deposits from wells that involves injecting carbon dioxide into a supply of water to form carbonic acid which is delivered to react in the well-bore with the deposits.

The carbonic acid is formulated using a supply of water which has been treated to place it in an "aggressive" state, so that the resulting aqueous acid solution has an acute affinity for the well deposit material. In this context, the term "aggressive" means that the water has a very low mineral content. This low mineral content creates a condition where the water is continually trying to pick up and retain additional minerals.

A preferred method described in the '587 application utilizes carbonic acid formed by injection of carbon dioxide into RO permeate (water removed from a reverse osmosis water treatment process after a membrane desalinization step, but before the water is rebalanced.) The acid is pumped downhole to dissolve calcium carbonate deposits and the resulting solution of calcium and bicarbonate is flushed from the well by water until the monitored precipitate is clear.

It has been observed experimentally that the aggressive water utilized in the '587 process may itself be sufficient, without the addition of the carbon dioxide, to erode calcium carbonate deposits from a water well. The present invention, thus, provides a process for removing carbonate deposits from water wells utilizing water placed in an aggressive state by diverting it from a water treatment process prior to restabilization, with or without the addition of carbon dioxide thereto.

BRIEF DESCRIPTION OF THE DRAWING

Embodiments of the invention have been chosen for purposes of illustration and description, and are discussed below with reference to the accompanying drawing which is a schematic view of a well water supply and treatment installation to which the process of the present invention can be applied.

DESCRIPTION OF THE PREFERRED EMBODIMENT

For illustrative purposes, the process of the invention is described as it relates to a simplified water system of the type used to supply a small community with water from a brackish water well for general household purposes. As shown in the drawing, the system includes a water well 10 and a water treatment facility 12.

The well 10 is of a deep well type having a borehole 14 drilled to a depth of 600–800 ft. below the Earth's surface to intersect a water-bearing stratum or aquifer 16. The wall of the borehole 14 from the surface of the well to a water intake zone 18 which extends 30–100 ft. above the bottom of the borehole 14 is covered with a steel casing 20 kept in place by means of a cement layer 22 formed between the casing 20 and the wall. The reservoir-well interface portion 18 at which water enters the well 10 is fitted with a metal screen liner 24. The top of the well 10 is capped at the Earth's surface by means of a wellhead 26.

Groundwater flows from the stratum 16 through the screen lining 24 into the well 10, from which it is drawn to the surface by means of a submerged pump 28 via a stainless steel discharge (drop) pipe 30 which projects through the wellhead 26 into the well to a point below the well static water level 32. The pump 28 moves water through the pipe 30 from the well 10 for delivery to the water treatment facility 12.

The illustrated water treatment facility 12 comprises a pre-treatment system 34, a membrane system 36, and a post-treatment system 38. A simple treatment plant 12 for processing brackish water drawn from a relatively pure source can comprise little more than filters for removal of solids and chlorinators for disinfecting. If needed, specific chemical processes can be added to remove known pollutants, and a softening process (such as a lime and soda ash process) can also be incorporated in order to remove a high content of calcium and magnesium salts. It will, of course, be appreciated that the simplified treatment plant 12 is shown merely by way of example and that the process of the invention can also be applied to more complex facilities whose treatment equipment is far more sophisticated and involves numerous other physical and chemical processing steps.

The simplified plant 12 shown in the drawing has a membrane system 36 for the treatment of brackish water that utilizes a reverse osmosis desalinization step in which water is brought in contact with a semipermeable membrane. Pressure is applied to the water to permit water to pass through the membrane but impede the passage of ions. The fresh water is then passed on to the post-treatment station 38 before being distributed for public consumption, and the brine waste is separately discharged, as indicated.

After passing through the pre-treatment system 34 and the membrane system 36, the water is in a highly "aggressive" state. The chemical and membrane separation processes to which the water has been subjected as part of its treatment leaves the water in a state of chemical inequilibrium and ion imbalance. Where softening has been conducted, the water is extremely soft and unstable. The pH is also typically less than 5.0. Accordingly, recalcification and other treatments for stabilization and pH control are performed at the post-treatment system 38, as necessary to remove the "aggressive" quality and restore a stable, neutral and properly balanced water quality, before passing the water on for distribution and consumption. Where, as in this example water system, the water is intended for household use, the post-treatment system 38 will provide additives, such as sodium hydroxide, and will make adjustments as needed for color, taste, odor, turbidity and softness. The post-treatment system 38 may also include a fluoridation step.

Water drawn from the well 10 by means of pump 28 and discharge pipe 30 for delivery to the treatment facility 12 is replenished by new water from the intake and recharge passageways of the stratum 16. As calcification occurs at the reservoir/well interface 18, the specific capacity of the well 10 diminishes.

In accordance with the principles described in copending application Ser. No. 046,587 (the whole of which is incorporated herein by reference), a weak acid solution is delivered into the borehole 14 for removal of built-up carbonate deposits and restoration of the well specific capacity. The well 10 is removed from the supply system and set off-line. Water diverted by means of a valve 40 from the water treatment facility 12, at a point following the membrane system 36 but before the post-treatment system 38, is injected with carbon dioxide $CO_2$ from a gas reservoir 42 to form an aqueous solution of $$H_2O + CO_2 \rightleftharpoons H_2CO_3.$$

A convenient source 42 of $CO_2$ is a commercially available gas cylinder bottle which is coupled by means of a gas flow regulator 46 to an acid treatment pipe 50 coming from the output of the membrane system 36. The pipe 50 connects through a pump 52 to deliver a flow of carbonic acid solution into the well 10 at an acid solution discharge pipe 56 which extends through the wellhead 26 into the wel 10 to point below the static water level 32. The discharge pipe 56 may be incorporated into a pipe 58 that is used to gain access through the wellhead 26 for purposes of measuring the water level of the well 10 with an electric tape (not shown). The electric tape may be inserted at a separate discharge pipe opening 60 above the surface of the well.

The carbonic acid solution is pumped into the well 10 at pipe 56. When the carbonic acid reaches calcium carbonate in the well, free calcium and bicarbonate are formed in solution:

$$H_2CO_3 + CaCO_3 \rightleftharpoons Ca + 2HCO_3.$$

The equation is similar for magnesium carbonate. The resulting solution is flushed from the well 10 using the submerged pump 28 and discharge pipe 30. The water drawn from the well is monitored until clear, at which point the well 10 can be returned to service.

A specific implementation of the aggressive water plus carbon dioxide process is set forth in the '587 application, and the reader is referred to that application for details.

LABORATORY TEST

A laboratory experiment was performed to determine if reverse osmosis (RO) permeate, without the addition of carbon dioxide, was aggressive enough to erode calcium carbonate from a well bore.

Identical volumes of calcium carbonate were placed in identical beakers. One beaker was filled with well water, one with untreated RO permeate and one with RO permeate saturated with carbon dioxide. The calcium level of the water was recorded before being added to the beakers and again after remaining in contact with the calcium carbonate for two hours. The calcium remained unchanged in the well water. There was an increase of 5 ppm in the untreated RO permeate and an increase of 20 ppm in the treated RO permeate. The experiment was repeated three times with similar results.

It was determined that the increase in calcium could only have come from the calcium carbonate. Thus, it was concluded that:

1. The well water alone was unable to erode calcium carbonate;
2. RO permeate, with the addition of carbon dioxide, was able to substantially erode calcium carbonate (see the confirming experimental data set forth in the '587 application); and
3. RO permeate, by itself, was also able to erode calcium carbonate; although, it appeared that about four times the volume of untreated RO permeate would be required to achieve the same results as with carbon dioxide treated RO permeate.

From the '587 application and the foregoing, it can be seen that, applying the invention, carbonate deposits can be removed by a process requiring no special equipment and presenting no extreme safety hazard, through usage of aggressive water diverted from a treatment process, optionally formulated as a weak aqueous acid through preferable addition of carbon dioxide. The process can be conducted with minimal training and at little cost, thereby lending itself to use by even the smallest water supply organizations.

The invention process, because of the larger volumes applied at a steady rate over a longer period of time, provides a more complete coverage than conventional techniques of the area to be treated. The solution reaches further into all areas of the borehole and the formation, so that a thorough etching of the buildup is accomplished. The higher pH of the aggressive water formulated as a carbonic acid solution compared with the concentrated acids used in conventional techniques greatly reduces the risk of personal injury and the danger of a spill. The aggressive water, whether alone or as a carbonic acid solution, is relatively harmless to the skin, and does not generate dangerous fumes. The need for standby emergency personnel is thus alleviated.

It will be appreciated with reference to the '587 application that various substitutions and modifications may be made to the described embodiments, without departing from the spirit and scope of the present invention as defined by the claims appended hereto.

What is claimed is:

1. A method of removing carbonate deposited in a water supply well by inflowing groundwater, comprising the steps of:
    treating a supply of water by means of a membrane system for desalinization which places the water in an aggressive state of chemical inequilibrium and ion imbalance having a keen affinity for carbonate;
    pumping a fluid comprising the treated supply of water, without restabilization, into the well to react with the deposited carbonate; and
    flushing the product of the reaction from the well.

2. A method as in claim 1, wherein the treating step includes a water softening process; and the pumping step comprises pumping a fluid comprising water that has been softened in the water softening process but not recarbonized.

3. In a water supply system having a brackish water supply well and a water treatment facility for processing water drawn from the well, including a membrane system for desalinization of the water which places the water in an aggressive state of chemical inequilibrium and ion imbalance having a keen affinity for carbonate and a post-treatment system for removal of the aggressivity by restabilization of the water, the method of restoring lost specific capacity of the well by removing carbonate deposited in the well by inflowing groundwater, comprising the steps of:
    diverting a supply of water in the aggressive state from the water treatment facility, at a point following the membrane system but before the post-treatment system;
    pumping a fluid comprising the treated supply of water, without restabilization, into the well to react with the deposited carbonate; and
    flushing the products of the reaction from the well.

4. In a water supply system as in claim 3, wherein the water treatment facility includes a water softening system, and wherein the pumping step comprises pumping a fluids comprising the treated supply of water that has been softened in the water softening process but not recarbonized.

5. A method of removing carbonate deposited in a water supply well by inflowing groundwater, comprising the steps of:
    treating a supply of water by means of a reverse osmosis system for desalinization which places the water in an aggressive state, as the reverse osmosis permeate;

pumping a fluid comprising the reverse osmosis permeate, without restabilization, into the well to react with the deposited carbonate; and flushing the product of the reaction from the well.

6. In a water supply system having a brackish water supply well and a water treatment facility for processing water drawn from the well, including a reverse osmosis membrane system for desalinization of the water which places the water in an aggressive state and a post-treatment system for removal of the aggressivity by restabilization of the water, the method of restoring lost specific capacity of the well by removing carbonate deposited in the well by inflowing groundwater, comprising the steps of:

diverting a supply of water in the aggressive state comprising reverse osmosis permeate from the water treatment facility, at a point following the membrane system but before the post-treatment system;

pumping a fluid comprising the treated supply of water, without restabilization, into the well to react with the deposited carbonate; and flushing the products of the reaction from the well.

* * * * *